United States Patent
Ching et al.

[15] 3,660,167
[45] May 2, 1972

[54] ALKALINE DRY CELL

[72] Inventors: Cho Kin Ching, 599 West 190th Street, New York, N.Y. 10040; Walter Cohen, 13 Fletcher Drive, Morganville, N.J. 07751; Stanley Tseng, 945 West End Avenue, New York, N.Y. 10025

[22] Filed: Nov. 4, 1970

[21] Appl. No.: 86,799

[52] U.S. Cl. ............................................................136/107
[51] Int. Cl. .....................................................H01m 21/00
[58] Field of Search.....................136/107, 138, 139, 36, 74, 136/111, 123, 83, 24, 120

[56] References Cited

UNITED STATES PATENTS

| | | | |
|---|---|---|---|
| 793,077 | 6/1905 | Hubbell | 136/74 |
| 2,234,732 | 3/1941 | Haunz | 136/53 |
| 2,480,839 | 9/1949 | Daniel | 136/107 |
| 3,060,254 | 10/1962 | Urry | 136/24 |
| 3,262,815 | 7/1966 | Langer et al. | 136/36 |
| 3,305,401 | 2/1967 | Aulin | 136/120 |

*Primary Examiner*—Anthony Skapars
*Attorney*—Popper, Bain, Bobis & Gilfillan

[57] ABSTRACT

An alkaline dry cell of high energy density in which a cathode of powdered manganese dioxide, carbon, and graphite has dispersed throughout it, short filaments of stainless steel, long filaments of stainless steel, and stainless steel powder.

8 Claims, 5 Drawing Figures

PATENTED MAY 2 1972
3,660,167
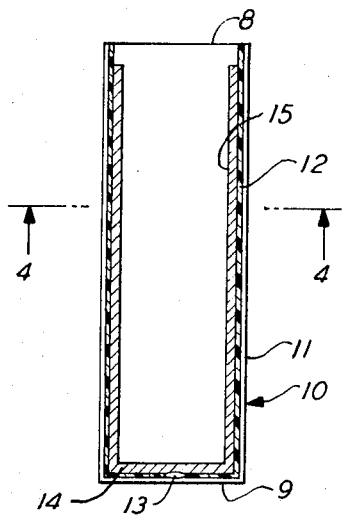
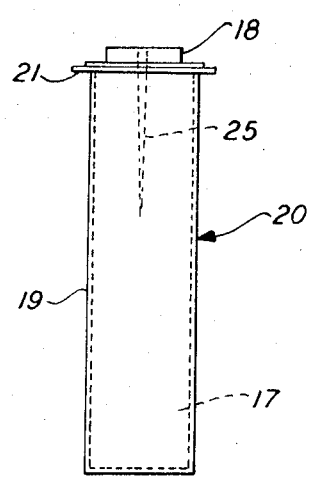
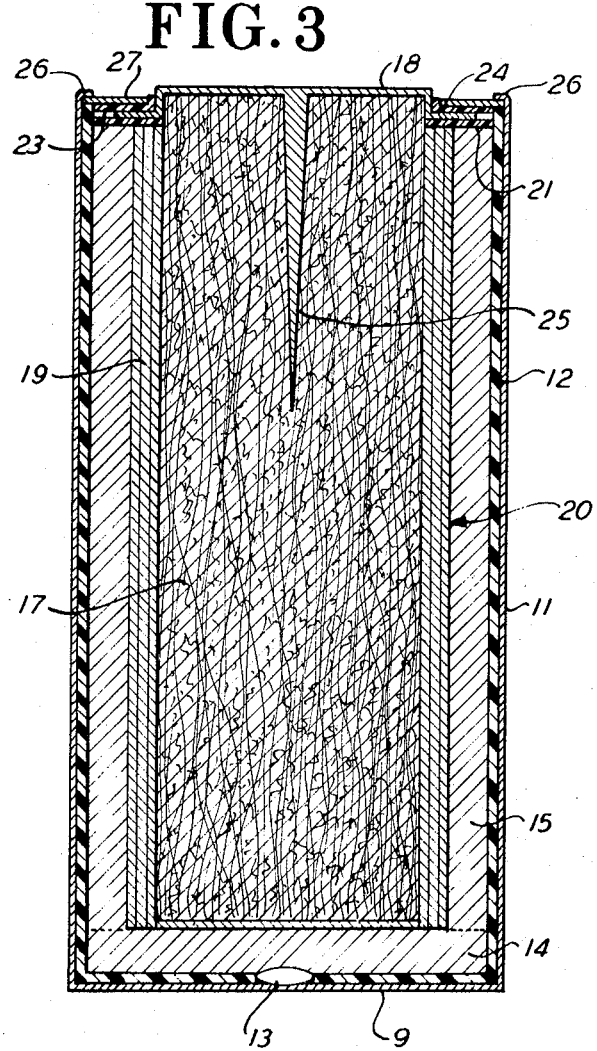
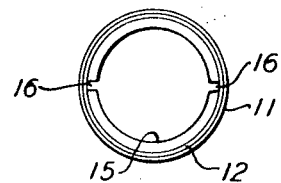
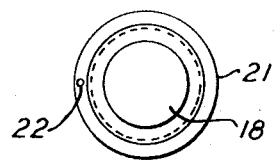
INVENTORS
CHO KIN CHING
WALTER COHEN
BY STANLEY TSENG
Popper, Bain, Bobio, Gilfillan
ATTORNEYS

ALKALINE DRY CELL

BACKGROUND OF INVENTION

1. Field of Invention

This invention relates generally to alkaline dry cells, and specifically to alkaline dry cells of improved efficiency at low operating temperature, as well as at ordinary temperature.

2. Prior Art

Numerous forms of primary alkaline dry cells are known. Current technology has developed these cells to the point where they have a relatively long and satisfactory shelf-life. In addition, they are capable of delivering sustained voltage until they closely approach exhaustion, near which point, there is a rapid fall-off in voltage. Alkaline cells exhibit superior performance in comparison with Le Clanche cells at both high and low temperatures. Although known cells efficiency is satisfactory the maximum achieved theoretical energy capacity is no greater than 85 percent. The conventional alkaline cell is however much less efficient at lower temperatures insofar as total available energy is concerned and it also goes to depletion at lower temperatures much more rapidly than at normal temperature. The manufacture of the conventional alkaline dry cell requires numerous difficult procedures. Particularly in the sealing of the alkaline dry cell, difficulties arise by reason of the necessity to provide for the relief of gaseous effusions, which if contained will ultimately bloat the cell and rupture it.

SUMMARY OF INVENTION

It has been found that by improved techniques and improved compositions to reduce internal resistance in alkaline dry cells, a cell can be made which is highly efficient at all temperatures and irrespective of the discharge rate. It has been further found that it is possible to manufacture an alkaline cell wherein manufacturing prodedures are greatly simplified, resulting in substantial reductions in labor, cost and in expenditure of time. Alkaline dry cells made in accordance with such improved technique do not suffer from a reduced shelf-life. The energy density (i.e. the Watt Hour/Volume) is superior to that of the conventional alkaline dry cell. The principal means by which such superiority is attained is by forming a cathode of powdered manganese dioxide, carbon and graphite, throughout which there is dispersed stainless steel powder, short filaments of stainless steel, and long filaments of stainless steel.

DRAWINGS

The foregoing objects and advantages as well as other objects and advantages may be attained by the device shown by way of illustration in the drawings in which:

FIG. 1 is a vertical sectional view of the anode of an alkaline dry cell before the cathode is inserted, FIG. 2 is a vertical sectional view of the cathode of an alkaline dry cell before being inserted into the anode and FIG. 3 is a vertical sectional view of the assembly, FIG. 4 is a top plan view of the anode; and FIG. 5 is a top plan view of the cathode.

PREFERRED EMBODIMENT

Referring now to the drawings in detail, the anode 10 has a steel jacket 11 which is generally tubular with a closed bottom 9 and an open top 8. The jacket 11 is a protective shell or covering that protects the internal parts of the alkaline dry cell from impact damage or damage due to deformation of the cell. The steel jacket is approximately 0.010 inch thick. A preformed liner 12 of non-conductive material having a external diameter substantially equal to the internal diameter of the steel jacket 11 is inserted into the jacket 11 to cover the side wall and the bottom. It is preferred that the liner 12 be made of some plastic material such as polyethylene or polyvinylchloride 0.006 inch thick. The liner 12 has a bottom center opening to which a contact button 13 is inserted. Since the liner 12 is of dielectric material the contact button 13 establishes conductivity between the the exterior of the liner 12 and the interior thereof. A deposit of amalgamated zinc powder is now placed in the liner 12 to form the bottom 14 of the anode. The bottom 14 of the anode is a layer originally 0.150 inch thick. The thickness is not critical. The bottom 14 is in electrical conductive contact with the contact button 13 and in turn with the jacket 11. The contact 13 is preferably a stainless steel button formed of the 400 series. To complete the anode from the bottom 13 to the top, an expandable split mold is positioned in the liner 12, seated on the bottom 14. The split mold has an external diameter of 0.437 inch leaving an interstitial space. The interstitial space is filled with amalgamated zinc powder to within approximately one-sixteenth of an inch from the top. A tapered pin is then inserted in the split mold. This expands the mold and compresses the amalgamated zinc powder to a thickness of approximately 0.030 inch. The tapered pin is removed and the split mold is thereupon withdrawn leaving a central cavity in the anode 15 for the insertion of a cathode assembly. Two generally vertical slots are formed in the vertical wall of the anode 15 by reason of the expansion of the split mold.

The composition of the anode 15 and the bottom of the anode 15 is 99.9 percent pure zinc metal which is melted; to this, 10 percent of mercury by weight is added and thoroughly mixed in. The mixture is then cooled and it is ground into a powder having a particle size of 50 to 100 mesh. Although the bottom 14 of the anode is not critical as to thickness, it is preferred that it be compressed to a layer 0.10 inch thick overlying the contact button 13. The powder comprising the anode may be compacted by vibrating the jacket until the mass is dense. This densification of the amalgamated zinc is performed before the mold is expanded. The bottom 14 should be compressed before the vertical portion 15 of the anode is formed.

The cathode 17 is separately prepared and is later inserted into the jacket 11 of the anode 10. A liquid electrolyte is first prepared, consisting of 30 percent potassium hydroxide and 70 percent by weight of water. To this zinc oxide is added until 80 percent saturation at 70° F. is attained. Then approximately 3 percent by weight of the entire solution of sodium carboxy-methyl-cellulose, high viscosity grade is added. Alternatively, other thickening agents such as "sodium starch glycolate" (Dupont) or "Kelzan" (Kelco Company, Clark, New Jersey) may be used to increase viscosity of the mixture. The electrolyte is now complete.

A mold is provided which has an internal diameter of 0.375 inch and a height substantially greater than the interior cavity of the anode 10. Into this mold a mixture of manganese dioxide, carbon, and graphite is inserted. It is preferred that the carbon have low ohmic resistance, such as "Conductex SC" (Columbian Carbon Co., New York, New York). The manganese dioxide should be battery grade. The mixture has the following composition: —5.5–6.5 grams manganese dioxide 0.3–0.5 grams carbon, 0.5–1.5 grams graphite, 0.5–1.5 grams stainless steel powder (0.020 × 0.006 × 0.006 inch), 0.2–0.8 grams stainless steel filaments (0.002 inch thick, 0.004 inch wide, 0.060 inch long), 0.2–0.8 grams longer stainless steel filaments (0.002 inch thick, 0.004 inch wide and 3.0 inches long).

Stainless steel powder and filaments are of the 400 series and preferably 416 series. This provides a cathode composition which is 5–17 percent by weight of stainless steel powder, 3.4–8 percent by weight short filaments, and 2.0–8.0 percent by weight long filaments. The manganese dioxide, carbon, graphite, stainless steel powder and short filaments are mixed by adding the ingredients together (except the long filaments) and agitating until the mixture is visibly determined to be complete. Twelve percent of water by weight of the mass of powder and filaments, including the as yet unadded long filaments is added to the mixture, and the mixture proceeds until the mass has a granular texture, resembling in appearance coarse beach sand. The long filaments are then bunched arranged in a square area approximately 3 inches by 3 inches and having a thickness of perhaps no greater than a one-sixteenth of an inch. The mixture previously obtained is then applied to this bunch or mat and the mat is invested with the mixture, and it is rolled into a cylindrical bundle, all the while kneading the bundle to thoroughly disperse the powder throughout the mat. The roll, mat or bunch 50 produced should be approximately three-eighths inch in diameter. It is loosely inserted into a cylindrical mold having an internal diameter of 0.375 inches. A cap or closure is applied to the bottom of the mold. A cap 18 is positioned across the bottom of the bore of the mold, and the mold is then closed at the bottom of the base plate. A plug is inserted in the top of the mold, and pressure of the order of 40,000 p.s.i. is applied. The base plate from the mold is then removed. The cap 18 has become bonded to the compacted mat so formed and the cathode 17 so formed is discharged from the mold and is allowed to dry for 24 hours or more. The cylindrical cathode 17 takes on the appearance of a shiny, dense, homogeneous rod. After the cathode is dried, it is inserted in a separator 19. The separator is a tubular body closed at the bottom and open at the top and fitting snugly over the compressed cathode 17. The separator is made of high wet strength paper which is ionically permeable and has a low ohmic resistance. The separator 19 is sufficiently strong and dense to prevent any anode or cathode particles from invading the cathode or anode by penetrating the separator 19. Suitable for this purpose is a paper such as Flex Pak Crepe manufactured by Hollingsworth and Vose Company of East Walpole, Massachusetts. It is preferred that the separator 19 be formed of double layers of paper, each of which is 0.0075 inch thick.

The cathode assembly 20 is now ready to be inserted into the anode assembly 10, but first a lower seal 21 is positioned underneath the cap 18. The lower seal 21 extends beyond the cap. The cathode assembly 20 is then applied to the anode 10 and the lower seal 21 limits the insertion of the cathode by resting upon the top of the vertical portion 15 of the anode. The lower seal 21 is provided with a passage 22 and is arranged in registration with the slot 16 left by the mold which is formed and compressed the vertical portion 15 of the anode. Through the hole 22 in the lower seal 21, the reserved electrolyte previously prepared is injected into the interface between the liner 12 and the separator 19 and thoroughly saturates the anode assembly 10 and the separator 19 must be achieved. When sufficient electrolyte has been added to accomplish this purpose, the aperture 22 is sealed by a suitable inert seal and such as an epoxy resin, and an upper seal 23 is applied. The upper seal 23 is an annular member having an upstanding flange 24 which abuts on the side of the cap 18. This seal 23 is made of dielectric material such as polyethylene or polyvinylchloride. The lower seal 21 is likewise made of polyvinylchloride. The cap 18 is made of an electrically conducted material such as stainless steel. The cap is provided with an axial pin 25 of 0.075 inch in diameter which penetrates into the cathode. The distance of penetration is preferably one half of the height of the cathode, although this may vary with differing sizes and configurations of the cell. On top of the upper seal, a steel ring 27 is provided to fill the space between the flange 24 and the jacket 11. The top 26 of the jacket 11 is formed or rolled over to retain the ring 27 in place and the assembly is complete.

It is believed that dense mat of long filaments throughout the cathode, in combination with the shorter filaments and the powder coact to conduct the electrical energy sr generated through readily accessible, highly conductive paths extending into each and every corner of the cathode, providing throughout the structure a continuing of conductivity that is not achieved in conventional constructions.

We claim:
1. An alkaline dry cell comprising:
   a. a cathode comprising:
      1. a wad of long, stainless steel filaments,
      2. a mixture of manganese dioxide, graphite, carbon, stainless steel powder and short stainless steel filaments dispersed throughout the wad,
      3. the wad and dispersed material compressed to a dense, hard, self sustaining body.
2. The device according to claim 1 in which the percentage composition of the cathode by weight is:

| | |
|---|---|
| stainless steel powder | 5–17% |
| long stainless steel filaments | 2–8% |
| short stainless steel filaments | 3.4–8% |
| manganese dioxide, carbon and graphite | 57–77.6% |
| water | 12% |

3. The device according to claim 1 in which the composition of the cathode by weight is:

| | |
|---|---|
| stainless steel powder | .5–1.5 grams |
| short stainless steel filaments | .2–.8 grams |
| manganese dioxide | 5.5–6.5 grams |
| carbon | .3–.5 grams |
| graphite | .5–1.5 grams |
| long stainless steel filaments | .2–.8 grams |

4. The device according to claim 1 and:
   a. an anode surrounding the cathode,
   b. a preformed liner of electrically nonconductive material sealed around the anode and cathode,
   c. a protective electrically conductive jacket surrounding the liner.
5. The device according to claim 1 and:
   a. a pin axially inserted in the cathode,
   b. a cap attached to the pin.
6. The device according to claim 4 and:
   a. an electrolyte between the cathode and the anode.
7. The device according to claim 4 and an electrically conductive contact between the jacket and the anode.
8. The device according to claim 1 and:
   a. an ionically permeable, low resistance, high wet strength separator surrounding the cathode,
   b. an anode comprising a cylinder of amalgamated zinc surrounding the cathode,
   c. an electrolyte in the separator between the anode and the cathode.

* * * * *